United States Patent [19]

Smolka et al.

[11] Patent Number: 5,362,363
[45] Date of Patent: Nov. 8, 1994

[54] AQUEOUS DISPERSIONS CONTAINING ALKALINE EARTH SOAPS AND/OR ALKALINE EARTH RESIN SOAPS FOR DEINKING PRINTED WASTEPAPER

[75] Inventors: Heinz-Gerd Smolka; Klaus Lehmann, both of Illertissen; Hans Hawel, Voehringen; Dieter Schraml, Illertissen; Klaus Hornfeck, Mettmann, all of Germany

[73] Assignee: Chemische Fabrik Gruenau GmbH, Illertissen, Germany

[21] Appl. No.: 848,994

[22] PCT Filed: Oct. 10, 1990

[86] PCT No.: PCT/EP90/01697

§ 371 Date: Apr. 20, 1992

§ 102(e) Date: Apr. 20, 1992

[87] PCT Pub. No.: WO91/05905

PCT Pub. Date: May 2, 1991

[30] Foreign Application Priority Data

Oct. 19, 1989 [DE] Germany .............................. 3934893

[51] Int. Cl.$^5$ ................................................ D21C 5/02
[52] U.S. Cl. ................................................ 162/8; 162/5
[58] Field of Search ............................ 162/5, 8, 6

[56] References Cited

U.S. PATENT DOCUMENTS

| | | | |
|---|---|---|---|
| 4,231,841 | 11/1980 | Calmanti et al. | 162/8 |
| 4,561,933 | 12/1985 | Wood et al. | 162/5 |
| 4,666,558 | 5/1987 | Wood et al. | 162/8 |
| 4,959,123 | 9/1990 | Lehmann et al. | 162/8 |

FOREIGN PATENT DOCUMENTS 30978 2/1984 Japan ........................ 162/5

OTHER PUBLICATIONS

Chemical Abstracts 106(20):158182c based on JP 61,266,688 A2 Nov. 1986.

*Primary Examiner*—Karen M. Hastings
*Attorney, Agent, or Firm*—Ernest G. Szoke; Wayne C. Jaeschke; Real J. Grandmaison

[57] ABSTRACT

The invention relates to aqueous dispersions of alkaline earth metal soaps and/or alkaline earth metal resin soaps for deinking printed wastepaper in which the dispersions contain A. alkaline earth metal salts of $C_{6-22}$ carboxylic acids and/or resinic acids and
B. $C_{6-22}$ oxoalcohols alkoxylated with 2 to less than 6 mol $C_{2-4}$ alkylene oxides and alkali metal and/or alkaline earth metal alumimo silicates corresponding to general formula I $$0.7\text{--}1.5 \ cat_{2/n}O \cdot Al_2O_3 \cdot 0.8\text{--}6 \ SiO_2$$

in which cat represents alkali metal and/or alkaline earth metal cations and n is the valency of the alkali metal and/or alkaline earth metal cations.

2 Claims, No Drawings

AQUEOUS DISPERSIONS CONTAINING ALKALINE EARTH SOAPS AND/OR ALKALINE EARTH RESIN SOAPS FOR DEINKING PRINTED WASTEPAPER

BACKGROUND OF THE INVENTION

1. Field of the Invention

This invention relates to aqueous dispersions of alkaline earth metal soaps and/or alkaline earth metal resin soaps for deinking printed wastepaper and to the use of aqueous dispersions containing A. alkaline earth metal salts of $C_{6-22}$ carboxylic acids and/or resinic acids and B. alkoxylated $C_{6-22}$ oxoalcohols and/or certain alkali and/or alkaline earth metal alumimo silicates for deinking printed wastepaper.

2. Discussion of Related Art

Today, wastepaper is used in large quantities for the production of, for example, newsprint and sanitary paper. The quality of these types of paper are determined by their lightness and color. To be able to produce high-quality paper, the printing inks have to be removed from the printed wastepaper. This is normally done by deinking processes essentially comprising two steps, namely:

1. disintegrating the wastepaper, i.e. fiberizing in water in the presence of the chemicals required for detachment of the printing ink particles and
2. removal of the detached printing ink particles from the fiber suspensions.

The second step can be carried out by washing or flotation (Ullmanns Encyclopädie der technischen Chemie, 4th Edition, Vol. 17, pages 570–571(1979). In flotation, which utilizes the difference in wettability between printing inks and paper fibers, air is forced or drawn through the fiber suspension. Small air bubbles attach themselves to the printing ink particles and form a froth at the surface of the water which is removed by savers.

The deinking of wastepaper is normally carried out at alkaline pH values in the presence of alkali metal hydroxides, alkali metal silicates, oxidative bleaches and surfactants at temperatures in the range from 30° to 50° C. Soaps and/or fatty alcohol polyglycol ethers are often used as surfactants which are responsible for the detachment and separation of the printing ink particles (Ullmanns Encyclopädie der technischen Chemie 4th Edition, Vol. 17, pages 571–572 (1979). DE-OS 31 44 387 describes a process for regenerating wastepaper using calcium soap solutions. The calcium soaps are made from fatty acids which, in a first step, are converted with sodium hydroxide into the corresponding alkali metal soaps. The alkali metal soaps are then reacted with calcined lime or milk of lime at temperatures of 50° to 90° C. to form the corresponding lime soaps. Since the capacity of the calcium soaps obtained to act as collectors for printing inks decreases with time, it is absolutely essential to add the lime soaps unchanged, i.e. immediately after their production, to the fiber suspensions before flotation.

In addition, it is known from DE 37 02 978 that fatty acids and/or resinic acids are suitable for the deinking of printed wastepaper in the form of their alkaline earth metal salts finely dispersed with dispersants in an oil-in-water dispersion which is liquid at normal temperature. The dispersants used are nonionic and/or anionic surfactants, for example alkyl polyglycol ethers and/or iso-alkyl polyglycol ethers containing 8 to 22 C atoms in the hydrocarbon radicals and 6 to 30 mol ethylene oxide and/or alkyl sulfates and/or alkyl polyglycol ether sulfates containing 8 to 22 C atoms in the hydrocarbon radicals in the form of their alkali metal and/or amine salts. The use of the dispersions described in this patent produces a fine dispersion of the calcium soaps and/or calcium resin soaps in the paper fiber suspensions, so that good deinking results are obtained. However, these dispersions often form very stable foams during flotation so that foam inhibitors have to be added to the fiber suspensions.

The problem addressed by the present invention was to provide aqueous, storable, finely divided dispersions of alkaline earth metal soaps and/or alkaline earth metal resin soaps for the regeneration of wastepaper which would eliminate the need to add foam inhibitors before or during flotation.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that, in aqueous dispersions of alkaline metal earth soaps and/or alkaline metal earth resin soaps containing alkoxylated $C_{6-22}$ oxoalcohols having degrees of alkoxylation of 2 to below 6 and/or certain alkali metal and/or alkaline metal earth alumino silicates, the alkaline earth metal salts are present in very fine distribution and the foam stabilities of these storable dispersions in flotation lie in a range which does not require the addition of foam inhibitors to the paper stock suspensions.

Accordingly, the present invention relates to aqueous dispersions of alkaline earth metal soaps and/or alkaline earth metal resin soaps for deinking printed wastepaper, characterized in that the dispersions contain A. alkaline earth metal salts of $C_{6-22}$ carboxylic acids and/or resinic acids and
B. $C_{6-22}$ oxoalcohols alkoxylated with 2 to less than 6 mol $C_{2-4}$ alkylene oxides and/or alkali metal and/or alkaline earth metal alumino silicates corresponding to general formula I $$0.7\text{--}1.5\ \text{cat}_{2/n}\text{O} \cdot \text{Al}_2\text{O}_3 \cdot 0.8\text{--}6\ \text{SiO}_2$$

in which cat represents alkali metal and/or alkaline earth metal cations and n is the valency of the alkali metal and/or alkaline earth metal cations.

The present invention also relates to a process for the production of aqueous dispersions containing A. alkaline earth metal salts of $C_{6-22}$ carboxylic acids and/or resinic acids and
B. $C_{6-22}$ oxoalcohols alkoxylated with 2 to less than 6 mol $C_{2-4}$ alkylene oxides and/or alkali metal and/or alkaline earth metal alumino silicates corresponding to general formula I $$0.7\text{--}1.5\ \text{cat}_{2/n}\text{O} \cdot \text{Al}_2\text{O}_3 \cdot 0.8\text{--}6\ \text{SiO}_2$$

in which cat represents alkali metal and/or alkaline earth metal cations and n is the valency of the alkali metal and/or alkaline earth metal cations, which is characterized in that mixtures containing a) carboxylic acids and/or resinic acids and b) alkoxylated $C_{6-22}$ oxoalcohols and/or alkali metal and/or alkaline earth metal alumino silicates corresponding to general formula I are prepared at 65° to 90° C., the mixtures thus prepared are added to aqueous mixtures–heated to 40° to 70° C.– of c) water, d) inorganic alkaline earth metal salts and, optionally, e) alkoxylated $C_{6-22}$ oxoalcohols and/or anionic and/or nonionic surfactants and the dispersions obtained are cooled with stirring to temperatures of 15° to 25° C. and subsequently homogenized at 15° to 25° C.

The present invention also relates to the use of aqueous dispersions containing

A. alkaline earth metal salts of $C_{6-22}$ carboxylic acids and/or resinic acids and B. $C_{6-22}$ oxoalcohols alkoxylated with 2 to less than 6 mol $C_{2-4}$ alkylene oxides and/or alkali metal and/or alkaline earth metal alumino silicates corresponding to general formula I

in which cat represents alkali metal and/or alkaline earth metal cations and n is the valency of the alkali metal and/or alkaline earth metal cations, for deinking printed wastepaper.

Suitable alkaline earth metal salts of $C_{6-22}$ carboxylic acids and/or resinic acids are magnesium, calcium, strontium and/or barium salts. Carboxylic acids and/or resinic acids in the form of their calcium salts are preferably used. The $C_{6-22}$ carboxylic acids and/or resinic acids may be saturated and/or unsaturated, may contain and/or may be free from OH groups and may be linear, branched and/or cyclic. Preferred $C_{6-22}$ carboxylic acids are aliphatic. Resinic acids may be aliphatic or aromatic and may contain one or more acid functions. Aliphatic carboxylic acids containing from 12 to 18 C atoms are preferably used. Examples of suitable carboxylic acids and/or resinic acids are caproic acid, captic acid, lauric acid, myristic acid, palmitic acid, stearic acid, oleic acid, ricinoleic acid, tallow fatty acid, palm oil fatty acids, synthetic $C_{6-22}$ fatty acid, abietic acid, agathenic acid and/or illuric acid.

Alkoxylated oxoalcohols which may be present in the aqueous dispersions to be used in accordance with the invention can be obtained by oxo synthesis (Kirk Othmer: Encyclopedia of Chemical Technology, Vol. 1, pp. 747 to 751 (1978). The educts used are olefins which are reacted with carbon monoxide and hydrogen in the presence of catalysts, for example cobalt catalysts, at temperatures of 50° to 200° C. and under pressures of 20.2 to 30.3 MPa to form aldehydes. The aldehydes obtained, which have one carbon atom more than the olefins used, are then reduced by hydrogenation to the corresponding primary alcohols (oxoalcohols). If linear olefins are used as starting materials, mixtures of linear and branched alcohols are obtained. If, by contrast, branched olefins are used, branched alcohols only are obtained. According to the invention, branched $C_{6-22}$ oxoalcohols may be used either on their own or in combination with linear $C_{6-22}$ oxoalcohols. Oxoalcohols containing 6 to 13 carbon atoms are preferred. The alkoxylation of the oxoalcohols with $C_{2-4}$ alkylene oxides, preferably with ethylene oxide and/or propylene oxide, is carried out by known industrial processes (cf. for example "Chemische Technologie" Vol 7 pp 131–132, Carl-Hanser-Verlag, München-Wien (1986). The average degree of alkoxylation corresponds to the molar quantity of alkylene oxides added on and is from 2 to below 6 and preferably from 3 to 5.

Alkali metal alumino silicates corresponding to general formula I, which may be present in the aqueous dispersions to be used in accordance with the invention, may readily be prepared by different methods. For example, water-soluble alkali metal silicates can be reacted with water-soluble alkali metal aluminates in the presence of water. To this end, aqueous solutions of the starting materials may be mixed together or a component present in solid form may be reacted with the other component in the form of an aqueous solution. Alkali metal alumino silicates are also obtained by mixing the two components present in solid form in the presence of water. Examples of compounds present in solid form are $Al(OH)_3$, $Al_2O_3$ or $SiO_2$. Examples of components present in the form of an aqueous solution are alkali metal silicate and alkali metal aluminate solutions.

The alkali metal alumino silicates prepared by precipitation and converted in finely divided form into aqueous suspensions may be converted from the amorphous state into the aged or the crystalline state by heating to temperature of 50° to 200° C. The calcium binding power, which is preferably in the range from 100 to 200 mg CaO/g anhydrous active substance, is found for example in preferred compounds corresponding to general formula III

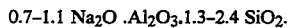

The calcium binding power of the alkali metal alumino silicates used in accordance with the invention is determined as follows:

1 g active substance alkali metal alumino silicate is added to 1 l of an aqueous solution containing 0.594 g $CaCl_2$ (corresponding to 300 mg CaO/l = 30 ° German hardness (Gh) and adjusted to pH 10 with dilute NaOH. The suspension is then stirred for 15 minutes at a temperature of 22° C. ±2° C. After the alkali metal alumino silicate has been filtered off, the residual hardness x of the filtrate is determined. The calcium binding power in mg CaO/g active substance is calculated therefrom in accordance with the formula $(30 - x) \cdot 10$.

The preferably crystalline alkali metal alumino silicates present in the form of an aqueous suspension may be separated from the aqueous solution remaining behind by filtration and dried at temperatures of, for example, 50° to 800° C. The active substance content of the alkali metal alumino silicates is determined on anhydrous alkali metal alumino silicates which have been dried for 1 hour at 800° C. The dried alkali metal alumino silicates containing varying amounts of bound water are obtained in the form of fine powders after size-reduction of the dried filter cakes. Alkali metal alumino silicates having average primary particle sizes of 0.5 to 10 μm are preferably used, those having average primary particle sizes of 2 to 5 μm being particularly preferred.

The alkali metal alumino silicates to be used in accordance with the invention are preferably used in the form of aqueous stabilized suspensions. Such suspensions are known, for example, from DE-OS 25 27 388. They may be prepared simply by mixing alkali metal alumino silicates with dispersants in the presence of water. The alkali metal alumino silicates which are present in anhydrous form, in moist form or in the form of aqueous suspensions are added to mixtures of water and dispersants. The temperature of the aqueous mixtures is between 20° and 70° C. Suitable dispersants are organic polymer compounds containing carboxyl and/or hydroxyl groups, for example polyacrylic acids, copolymers of acrylic acid and/or maleic acid with vinyl methyl ether and/or vinyl acetate, phosphonic acids containing at least one other phosphonic acid and/or carboxyl group, for example 1-hydroxyethane-1, 1-diphosphonic acid, phosphoric acid alkyl esters containing 3 to 20 C atoms in the alkyl chains, for example phosphoric acid esters of butyl alcohol or isooctyl alcohol, nonionic surfactants having a cloud point in water below 90° C. (as determined in accordance with DIN 53 917), for example alkoxylated fatty alcohols, oxoalcohols, fatty acids and/or fatty amines, surface-active sulfonates, for example olefin sulfonates and/or $\alpha$-sulfofatty acids and/or $\alpha$-sulfofatty acid $C_{1-4}$ alkyl esters in the form of their alkali metal salts and/or swellable water-insoluble layer silicates. Ethoxylated $C_{6-22}$ oxoalcohols having degrees of alkoxylation of 2 to 6 are preferably used as dispersants. The alkali metal alumino silicate content in the stabilized suspensions is between 20 and 50% by weight and the content of dispersants between 0.5 and 3% by weight. The pH value of the suspensions is between 7 and 13 and preferably between 8 and 12.

Alkaline earth metal alumino silicates and mixtures of alkali metal and alkaline earth metal alumino silicates are formed or may be prepared from alkali metal alumino silicates in the presence of alkaline earth metal ions, the alkali metal cations of the alumino silicates being partly or completely replaced by alkaline earth metal cations.

The aqueous dispersions to be used in accordance with the invention preferably contain 10 to 60% by weight and more preferably 20 to 40% by weight of component A and preferably 1 to 20% by weight and more preferably 1 to 15% by weight of component B.

Particularly preferred dispersions of calcium soaps to be used in accordance with the invention contain alkoxylated oxoalcohols and alkali metal and/or alkaline earth metal alumino silicates, the ratio by weight of alkoxylated oxoalcobols to alkali metal and/or alkaline earth metal alumino silicates preferably being from 1:0.5 to 1:10 and more preferably from 1:1 to 1:5.

The aqueous dispersions to be used in accordance with the invention may contain as optional constituents inorganic compounds, such as kaolins, talcum and/or calcium carbonate, in quantities of 0.5 to 20% by weight and also nonionic and/or anionic surfactants in quantities of 1 to 40% by weight, based on the content of component A. Where anionic surfactants are used, the quantities are between 1 and 10% by weight, based on the content of the alkaline earth metal soaps. Suitable nonionic dispersants are, for example, alkyl polyglycol ether, hydroxyalkyl polyglycol ether, alkenyl polyglycol ether, alkaryl polyglycol ether, acyl polyglycol ester and/or polyoxyethylene glycerol fatty acid ester respectively containing 8 to 22 C atoms in the linear, branched and/or cyclic hydrocarbon radicals and 6 to 100 mol ethylene oxide. Suitable anionic dispersants are, for example, alkali metal and/or amine salts of alkyl sulfonates, alkyl aryl sulfonates, alkyl sulfates, alkyl polyglycol ether sulfates, alkyl aryl polyglycol ether sulfates and/or protein fatty acid condensates. The average degree of alkoxylation of the alkyl polyglycol ether sulfate salts and alkyl aryl polyglycol ether sulfate salts is between 1 and 30. The anionic surfactants mentioned contain 8 to 22 C atoms in the linear, branched and/or cyclic hydrocarbon radicals.

According to the invention, the aqueous dispersions to be used in accordance with the invention are produced by preparing mixtures containing a) $C_{6-22}$ carboxylic acids and/or resinic acids and b) $C_{6-22}$ oxoalcohols alkoxylated with 2 to less than 6 mol $C_{2-4}$ alkylene oxides and/or alkali metal and/or alkaline earth metal alumino silicates corresponding to general formula I at a temperature of 65° to 90° C. These mixtures may contain the entire quantity of or only part of the alkoxylated oxoalcohols present in the dispersions to be produced. These mixtures preferably contain water in quantities of 1 to 20% by weight, based on the total quantity of water. The acid-containing mixtures which may contain inorganic compounds, such as kaolins, talcum and/or calcium carbonate, are added with stirring to aqueous mixtures heated to 40° to 70° C. These aqueous mixtures are prepared by adding d) inorganic alkaline earth metal salts, for example calcium hydroxide and/or magnesium hydroxide, and e) optionally alkoxylated oxoalcohols and/or optionally one or more of the above-mentioned nonionic and/or anionic surfactants with stirring to water which has been heated to 65 to 90° C. Alkaline earth metal salts, alkoxylated oxoalcohols and surfactants may be added to the water in any order. The aqueous homogeneous mixtures obtained are then cooled to 40 to 70° C. After addition of the mixtures containing carboxylic acids and/or resinic acids to the aqueous mixtures, the dispersions obtained are cooled with stirring to temperatures of 15° to 25° C. and subsequently homogenized at those temperatures.

The aqueous dispersions produced by the process according to the invention are distinguished by high stability in storage. The air introduced into the dispersions during their production escapes very quickly so that no stable foam cushions are formed on the surface of the dispersions, even in the presence of high-foaming surfactants, such as alkyl polyglycol ether sulfates, alkyl aryl polyglycol ether sulfates and/or protein fatty acid condensates. The alkaline earth metal soaps are present in the dispersions in very fine distribution.

The aqueous dispersions to be used in accordance with the invention are preferably added to paper stock suspensions in quantities of 0.2 to 2.0% by weight and more preferably in quantities of 0.2 to 1.5% by weight, based on air-dry paper stock. Air-dry paper stock means that an equilibrium state of internal moisture has been established in the paper stock. This equilibrium state depends on the temperature and relative humidity of the air.

In the presence of the aqueous dispersions used in accordance with the invention, printing inks of varying chemical composition, for example rotary newsprint inks, book printing inks, offset printing inks, illustration intaglio printing inks, flexographic printing inks, laser printing inks and/or packaging intaglio printing inks, may be removed from printed wastepaper, for example newspapers, magazines, computer paper, journals, brochures, forms, telephone directories and/or catalogues.

Printed wastepaper is refined at 20° to 60° C. in a pulper in an aqueous solution typically containing 0.5 to 3.0% by weight hydrogen peroxide (100% by weight), 0.5 to 2.5% by weight sodium hydroxide (100% by weight), 2.0 to 5.0% by weight soda waterglass (ratio by weight $SiO_2$ to $Na_2O=3.3:1$, solids content 35% by weight), 0.2 to 2.0% by weight aqueous dispersions according to the invention and 0.1 to 0.3% by weight complexing agent—all percentages by weight are based on air-dry wastepaper—at a pulp density of, for example, 1 to 15% by weight. After a residence time of 1 to 3 hours at temperatures of 20° to 60° C., the paper stock suspensions are stirred into water or water is added to them so that 0.8 to 2% by weight paper stock suspensions are obtained. After removal of the coarse, non-floatable constituents present in the paper stock suspensions, the detached printing ink particles are removed from the paper stock suspensions in known manner by flotation.

Wastepaper deinked in the presence of aqueous dispersions according to the invention are distinguished by very high degrees of whiteness. During flotation, the dispersions according to the invention form ink-containing froths which, irrespective of the wastepaper used, are considerably less stable compared with froths of the dispersions containing alkaline earth metal soaps typically used, so that the dispersions according to the invention can be used without addition of foam inhibitors.

EXAMPLES

In the following, quantities in "parts" are "parts by weight". The viscosities were measured with a Brookfield viscosimeter.

Preparation Of Dispersions According To The Invention

The alkali metal alumino silicate present in the dispersions had the chemical composition $Na_2O.Al_2O_3.2 SiO_2$ and was used in the form of a 48% by weight aqueous suspension stabilized with 1.5% by weight isotridecyl alcohol .4 mol ethylene oxide.

Dispersion A

485 Parts water were heated to 70° C. in a heatable and coolable reaction vessel equipped with a cross propeller stirrer and a heatable feed vessel and 27 parts n-octadecanol.20 mol ethylene oxide (EO) and 38.7 parts calcium hydroxide were then added with stirring. The aqueous homogeneous mixture was then cooled to 50° C. 270 Parts animal $C_{12-18}$ fatty acid, 27 parts isotridecyl alcohol.4 mol EO, 100 parts 48% by weight aqueous sodium alumino silicate suspension and 54 parts water were mixed with stirring at 70° C. in the feed vessel which was equipped with a cross propeller stirrer.

The fatty-acid-containing dispersion heated to 70° C. was then added with stirring to the aqueous mixture cooled to 50° C. After the addition, the mixture was cooled with stirring to 18°–20° C. and homogenized at that temperature.

A 41% by weight blue-tinged, grit-free dispersion was obtained and, even after standing for three months at room temperature (15°–25° ), showed no signs of separation. Its viscosity at 20° C. measured 1,100 mPa.s Dispersion B An aqueous, homogeneous mixture of 430 parts water, 24 parts n-octadecanol.20 mol EO and 34.4 parts calcium hydroxide and a fatty-acid-containing dispersion of 240 parts animal $C_{12-18}$ fatty acid, 24 parts isotridecyl alcohol.4 mol EO and 200 parts 48% by weight aqueous sodium alumino silicate suspension were prepared in the same way as described for dispersion A. The fatty-acid-containing dispersion heated to 70° C. was then added with stirring to the aqueous mixture kept at 50° C. After the addition, the mixture was cooled with stirring to 18° to 20° C and subsequently homogenized.

A 42% by weight, thinly liquid, very fine, blue-tinged, grit-free dispersion was obtained and, even after standing for three months at room temperature (15°–25° ), showed no signs of separation. Its viscosity at 20° C. measured 1,000 mPa.s Dispersion An aqueous, homogeneous mixture of 500 parts water, 18 parts n-octadecanol.20 mol EO and 38.7 parts calcium hydroxide and a fatty-acid-containing dispersion of 270 parts animal $C_{12-18}$ fatty acid, 18 parts isotridecyl alcohol.4 mol EO, 100 parts 48% by weight aqueous sodium alumino silicate suspension and 55 parts water were prepared in the same way as described for dispersion A. The fatty-acid-containing dispersion heated to 70° C. was then added with stirring to the aqueous mixture kept at 50° C. After the addition, the mixture was cooled with stirring to 18° to 20° C. and subsequently homogenized.

A 39% by weight, thinly liquid, very fine, blue-tinged, grit-free dispersion was obtained and, even after standing for three months at room temperature (15°–25° ), showed no signs of separation. Its viscosity at 20° C. measured 800 mPa.s.

Dispersion D

An aqueous, homogeneous mixture of 485 parts water, 13.5 parts n-octadecanol.20 mol EO, 13.5 parts polyoxyethylene glycerol $C_{16-18}$ fatty acid ester —20 EO and 38.7 parts calcium hydroxide and a fatty-acid-containing dispersion of 270 parts animal $C_{12-}$ fatty acid, 27 parts isotridecyl alcohol.4 mol EO, 100 parts 48% by weight aqueous sodium alumino silicate suspension and 53 parts water were prepared in the same way as described for dispersion A.

The fatty-acid-containing dispersion heated to 70° C. was then added with stirring to the aqueous mixture kept at 50° C. After the addition, the mixture was cooled with stirring to 18° to 20° C. and subsequently homogenized.

A 41% by weight, thinly liquid, very fine, blue-tinged, grit-free dispersion was obtained and, even after standing for three months at room temperature (15°–25° ), showed no signs of separation. Its viscosity at 20° C. measured 1,000 mPa.s.

Dispersion E

Dispersion E was prepared in the same way as dispersion D but differed from dispersion D in that 13.5 parts protein $C_{12-24}$ fatty acid condensate, potassium salt, were used instead of 13.5 parts polyoxyethylene glycerol fatty acid ester —20 EO. The 41% by weight, thinly liquid, very fine, blue-tinged, grit-free dispersion obtained, which showed no signs of separation even after standing for three months at room temperature (15°–25° C. ), had a viscosity of 250 mPa.s (as measured as 20° C. ).

Dispersion F

Dispersion F was prepared in the same way as dispersion D but differed from dispersion D in that 13.5 parts $C_{12-14}$ alkyl polyglycol ether sulfate —4 EO, sodium salt, were used instead of 13.5 parts polyoxyethylene glycerol $C_{16-18}$ fatty acid ester —20 EO.

The 41% by weight, thinly liquid, very fine, blue-tinged, grit-free dispersion obtained, which showed no signs of separation even after standing for three months at room temperature (15°–25° C.), had a viscosity of 400 mPa.s (as measured at 20° C.).

Dispersion G

An aqueous, homogeneous mixture of 485 parts water, 27 parts n-octadecanol.20 mol EO and 38.7 parts calcium hydroxide and a fatty-acid-containing dispersion of 270 parts animal $C_{12-18}$ fatty acid, 27 parts isotridecyl alcohol.4 mol EO, 100 parts kaolin (technical) and 53 parts water were prepared in the same way as described for dispersion A. The fatty-acid-containing dispersion was then added with stirring to the aqueous mixture kept at 50° C. After the addition, the mixture was cooled with stirring to 18° to 20° C. and subsequently homogenized.

The 41% by weight, thinly liquid, fine, faintly blue-tinged and slightly gritty dispersion obtained which, even after standing for three months at room temperature (15°–25°), showed no signs of separation had a viscosity of 340 mPa.s (as measured at 20° C.).

Dispersion H

Dispersion H was prepared in the same way as dispersion G except that 100 parts talcum were used instead of 100 parts technical grade kaolin. The 41% by weight, thinly liquid, fine, faintly blue-tinged and slightly gritty dispersion obtained which, even after standing for three months at room temperature (15°–25°), showed no signs of separation had a viscosity of 200 mPa.s (as measured at 20° C.).

Dispersion I

Dispersion I was prepared in the same way as dispersion G except that 270 parts synthetic fatty acid (acid value 190–200) were used instead of 270 parts animal $C_{12-18}$ fatty acid. The 41% by weight, thinly liquid, fine, blue-tinged and grit-free dispersion obtained which, even after standing for three months at room temperature (15°–25°). showed no signs of separation had a viscosity of 1,200 mPa.s (as measured at 20° C.).

Application Examples 110 g air-dry (=100 g bone-dry) printed wastepaper (50% by weight newspapers and 50% by weight magazines) were disintegrated with 1890 ml of an aqueous solution containing (based on air-dry wastepaper)

1% by weight sodium hydroxide (100% by weight)
3.0% by weight soda waterglass (ratio by weight $SiO_2$ to $Na_2O$ =3.3:1, solids content 35% by weight)
0.2% by weight of a 40% by weight aqueous solution of diethylenetriamine pentaacetic acid sodium salt
0.85% by weight hydrogen peroxide (100% by weight) and
0.7% by weight aqueous dispersion according to the invention for 15 minutes at 45° C. and at a pulp density of 5% by weight using a dispersion disk (2500 revolutions per minute). The water used had a hardness of 17° Gh (German hardness). After 2 hours at 45° C., the paper stock suspensions were diluted with 4 l water, 17° Gh, and the coarse, non-floatable components present in the paper stock suspensions were removed in 5 minutes in a deflaker. The deflaked paper stock suspensions were then transferred to a laboratory flotation cell, made up with water, 17° Gh, to the level of the froth overflow of the cell and subsequently floated for 10 minutes, the level being kept constant at the froth overflow by addition of water. The paper stock suspensions obtained were then thickened to a pulp density of 20% by weight and diluted to a pulp density of 4% by weight by addition of 800 ml water, 17° Gh, disintegrated and acidified to pH 6 with dilute sulfuric acid.

Quantities of 100 g of these paper stock suspensions were then made up with water to 500 ml (pulp density: 0.8% by weight) and filtered under suction through a filter paper (diameter 12 cm). The sheet of paper thus formed was dried after smoothing and its whiteness was measured (Elrepho R 457).

The results are shown in Table 1

TABLE 1

| Dispersions used | Whiteness R 457 (in %) |
|---|---|
| A | 50.1 |
| B | 49.8 |
| C | 50.0 |
| D | 50.0 |
| E | 49.7 |
| F | 49.4 |
| G | 50.0 |
| H | 49.3 |
| I | 50.3 |
| For comparison: | |
| Commercially available, aqueous dispersion containing $C_{12-18}$ fatty acid in the form of its calcium salt | 49.5 |

By comparison with the commercially available dispersion containing calcium soap, the dispersions to be used in accordance with the invention gave equivalent deinking results. The major advantage of the dispersions according to the invention was that the stability of the froths containing printing inks formed during flotation was considerably lower than that of the printing-ink-containing froth of the commercially available soap-containing dispersion so that of foam inhibitor had to be added to the paper stock suspensions.

We claim:

1. A process of regenerating wastepaper containing printing ink particles comprising the steps of
   (1) fiberizing said waste paper in an aqueous alkaline deinking solution containing no foam inhibitors and containing a deinking effective quantity of an aqueous dispersion of alkaline earth metal soaps alkaline earth metal resin soaps, said dispersion consisting of (a) an alkaline earth metal salt of a $C_6$–$C_{22}$ carboxylic acid or resinic acid, (b) a $C_6$–$C_{22}$ oxalcohol alkoxylated with from about 2 to less than 6 mols of a $C_2$–$C_4$ alkylene oxide, and (c) an alkali metal or alkaline earth metal aluminosilicate corresponding to formula I $$0.7\text{--}1.5 \text{ cat}_{2/n} O \cdot Al_2 O_3 \cdot 0.8\text{--}6 \text{ SiO}_2 \quad (I)$$

wherein cat represents an alkali metal or alkaline earth metal cation and n is the valence o the alkali metal or alkaline earth metal cation, and
   (2) removing the detached ink particles from the deinking solution.

2. A process as in claim 1 wherein the ratio by weight of said alkoxylated oxoalcohol to said aluminosilicate is from about 1:0.5 to about 1:10, respectively.

* * * * *